United States Patent [19]

Pian et al.

[11] Patent Number: 5,357,632
[45] Date of Patent: Oct. 18, 1994

[54] DYNAMIC TASK ALLOCATION IN A MULTI-PROCESSOR SYSTEM EMPLOYING DISTRIBUTED CONTROL PROCESSORS AND DISTRIBUTED ARITHMETIC PROCESSORS

[75] Inventors: Chao-Kuang Pian, Anaheim; Hans L. Habereder, Orange, both of Calif.

[73] Assignee: Hughes Aircraft Company, Los Angeles, Calif.

[21] Appl. No.: 742,781

[22] Filed: Aug. 8, 1991

Related U.S. Application Data

[63] Continuation-in-part of Ser. No. 462,250, Jan. 9, 1990, abandoned.

[51] Int. Cl.$^5$ .......................... G06F 9/46; G06F 9/445
[52] U.S. Cl. .................. 395/650; 364/280.6; 364/281; 364/281.3; 364/281.6
[58] Field of Search ................. 395/650, 800

[56] References Cited

U.S. PATENT DOCUMENTS

| | | | |
|---|---|---|---|
| 4,356,546 | 10/1982 | Whiteside et al. | 395/575 |
| 4,403,286 | 9/1983 | Fry et al. | 395/650 |
| 4,414,624 | 11/1983 | Summer, Jr. et al. | 395/650 |
| 4,692,860 | 9/1987 | Anderson | 340/825.05 |
| 4,736,318 | 4/1988 | Delyani et al. | 395/700 |
| 4,805,107 | 2/1989 | Kieckhafer et al. | 395/650 |
| 4,839,798 | 6/1989 | Eguchi et al. | 395/650 |
| 5,031,089 | 7/1991 | Liu et al. | 395/725 |
| 5,099,418 | 3/1992 | Pian et al. | 395/650 |
| 5,107,420 | 4/1992 | Kametani | 395/650 |

*Primary Examiner*—Parshotam S. Lall
*Assistant Examiner*—Krisna Lim
*Attorney, Agent, or Firm*—W. K. Denson-Low

[57] ABSTRACT

A plurality of control processors distribute data to be processed to a corresponding plurality of arithmetic processors using a dynamic allocation arrangement. The arithmetic processors process blocks of information and communicate the blocks of processed information to the control processors for subsequent processing as necessary. The control processors are implemented to efficiently allocate tasks to the arithmetic processors and to partition blocks of data for allocation as separate partitioned tasks to the arithmetic processors. This partitioning of blocks of data to be processed as partitioned tasks significantly reduces the delay until the results are available by distributing the task over a plurality of arithmetic processors. It also significantly improves utilization of processing resources by assigning the task to a plurality of processors that may be available.

6 Claims, 7 Drawing Sheets

DYNAMIC TASK ALLOCATION IN A MULTI-PROCESSOR SYSTEM EMPLOYING DISTRIBUTED CONTROL PROCESSORS AND DISTRIBUTED ARITHMETIC PROCESSORS

BACKGROUND

This application is a continuation-in-part of U.S. patent application Ser. No. 07/462,250, filed Jan. 9, 1990, now abandoned.

BACKGROUND

The present invention relates generally to computer systems, and in particular, to task allocation for improved multi-processor system operation.

Related art includes multi-processor systems having dynamic allocation of resources. Multi-processor systems having dynamic allocation of resources in general are old in the art. The article entitled "Signal Processing Through Macro Data Flow Architecture" by Plan et al, 1985 NAECON Proceedings, which is herein incorporated by reference, provides an overview of a multi-processor system.

Multi-processor systems combine multiple processors to gain increased processing bandwidth. However, the efficiency of such systems is significantly reduced by inefficient resource management implementations. For example, a high processing bandwidth capability may be only partially utilized if the processor is waiting for task assignments or waiting for data. Task assignments have been improved with dynamic allocation algorithms and data availability is improved with buffer memories, such as FIFOs, stacks, and cache memories. However, significant inefficiencies still exist. For example, one processor may be performing complex processing operations on an array of data while other processors are available for processing.

The Motorola 68000 microprocessor family includes many important processor features, such as stack, queue, and flag related operations, buses and dedicated input and output channels, and cache memory. See the "Motorola M68000 Programmer's Reference Manual", Prentice-Hall (1984), and the "MC68020 32-Bit Microprocessor User's Manual", Prentice-Hall (1984), which are herein incorporated by reference.

SUMMARY OF THE INVENTION

The present invention provides an improved arrangement and method for allocating tasks in a multi-processor system. For example, in one embodiment, a plurality of distributed processor pairs are provided with each pair comprising a distributed control processor and a distributed arithmetic processor. Each control processor assigns processing tasks to its related arithmetic processor using dynamic allocation of processor resources under control of a control program executed by the control processor. Each of the arithmetic processors process blocks of information and then communicate the blocks of processed information to other arithmetic processors for subsequent processing as required.

The control program in each control processor is implemented to efficiently allocate tasks to the arithmetic processors. It partitions blocks of data for allocation as separate partitioned tasks to the arithmetic processors. This partitioning of blocks of data to be processed as partitioned tasks significantly reduces the delay or latency by distributing the tasks to multiple arithmetic processors. In addition, it significantly improves utilization of processing resources by assigning a processing task to a plurality of arithmetic processors that may be available.

More specifically, the present invention provides for a distributed data flow signal processing network for processing data flow signal processing primitive tasks in a manner that balances the processing load among nodes of the network. The network comprises a plurality of distributed control processors, each comprising a central processing unit coupled to a data memory, and to a program memory having a queue. One of the distributed control processors comprises a supervisory control processor having additional queues equal in number to the number of distributed control processors in the network, and each of the additional queues are associated with a respective one of the distributed control processors. A first communication link is coupled between each of the distributed control processors for transferring control messages therebetween.

A plurality of distributed arithmetic processors are provided, each comprising a central processing unit and a data memory, wherein individual ones of the plurality of distributed arithmetic processors are respectively associated with a selected one of the plurality of distributed control processors to form a plurality of processing nodes. A second communication link is coupled between each respective distributed control processor and its associated distributed arithmetic processor that forms a respective processing node, that is used to transfer control messages and data blocks therebetween. A third communication link comprising a data bus is coupled between each of the distributed arithmetic processors for transferring data blocks therebetween.

Each of the distributed control processors comprises means for monitoring the number of signal processing primitive tasks that are to be processed by its associated arithmetic processor and for transferring processing control over a selected task to the supervisory control processor if the number of processing tasks are above a predetermined limit. The supervisory control processor comprises means for monitoring the number of processing tasks to be performed by each of the processing nodes, and for causing the execution of the selected task by a selected one of the processing nodes in a manner that adaptively balances the processing load among all nodes of the network.

Accordingly, a feature of the present invention is to provide an improved distributed data flow signal processing network. Another feature of the present invention is to provide an improved task allocation arrangement for a distributed data flow signal processing network that processes primitive signal processing tasks in a manner that balances the processing load among nodes of the network.

BRIEF DESCRIPTION OF THE DRAWINGS

The foregoing and other features and advantages of the present invention will become apparent from the following detailed description taken in conjunction with the accompanying drawings, wherein like references numerals designate like structural elements, and in which:

FIG. 2, comprising

DETAILED DESCRIPTION

Figure 1:
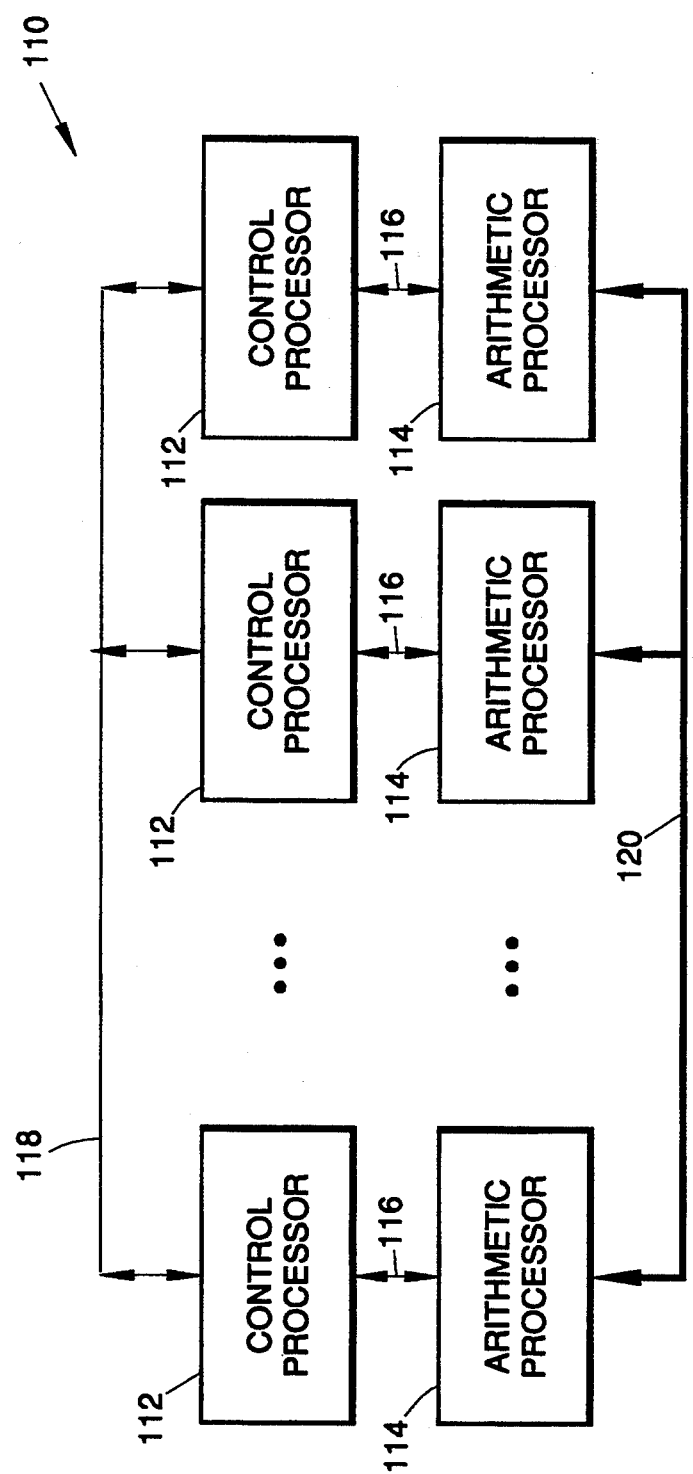
FIG. 1 is a block diagram representation of a multi-processor system in accordance with the principles of the present invention.

FIG. 1 is a block diagram of one configuration of a multi-processor system 110. For convenience, it is disclosed as being implemented with programmable processors including a plurality of control processors 112 and a plurality of arithmetic processors 114 arranged in pairs of one control processor and one arithmetic processor. Each control processor communicates with its related arithmetic processor 114 with messages over communication lines 116. The control processors 112 communicate with each other with messages over communication lines 118. The arithmetic processors 114 communicate with each other by transferring dam over a data bus 120. The control processors 112 each operate under control of a stored program that performs task allocation for the arithmetic processors 114 implemented with multi-processor management operations using dynamic allocation, implemented with nonhierarchial communication between the control processors 112, and implemented to store the programs for the tasks that are allocated to it, and have communicated data buffered in FIFOs, and have interprocessor communication implemented through processor input/output logic operating under control of the stored program. The foregoing is accomplished in a manner that is well understood by those skilled in the art.

Each of the distributed processors 112 and 114 operate under control of a program stored in a main memory. The control processors 112 execute a processing management program to dynamically allocate tasks to the arithmetic processors 114. The control processors 112 receive processing complete signals 116 from the arithmetic processors 114 that are indicative of completion of a task, the arithmetic processors receive processed data from the other arithmetic processors 114 on the data bus 120 and supply data to be processed to the other arithmetic processors 114 on the data bus 120.

A diagram of the processing management operations in the system of FIG. 1 is shown in FIG. 2. These operations may be implemented as a flow diagram under program control in a programmable processor, or as a state diagram with a state machine, or the like. The FIG. 2 configuration uses a task queue for storing data to be processed and for storing a header defining the task to be performed and uses processor available flags to define processors available for performing tasks. The queues and flags may be implemented with arrangements well-known to those skilled in the art.

Figure 2A:
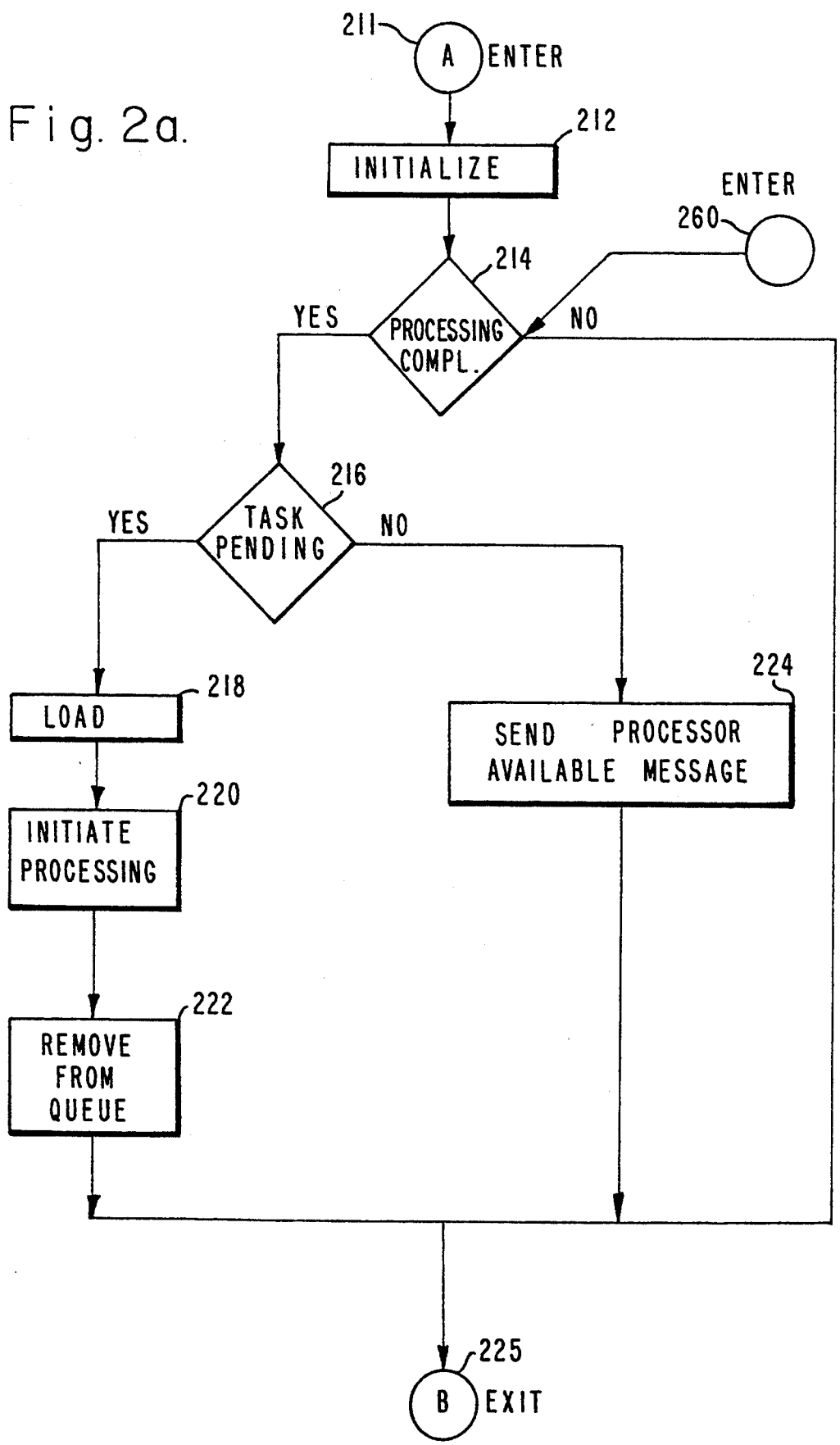
FIGS. 2a and 2b, is a flow diagram or state diagram of a task allocation arrangement in accordance with the system of FIG. 1.

The program operations performed in each control processor 112 are shown in FIG. 2a. Each control processor 112 controls a related arithmetic processor 114 using communication lines 116 with interprocessor messages, and communicates with other control processors 112 through communication lines 118 with interprocessor messages. For convenience, a particular control processor executing the control program is termed the instant control processor 112 and the arithmetic processor 114 related to the instant control processor 112 is termed the related arithmetic processor 114.

Figure 2B:
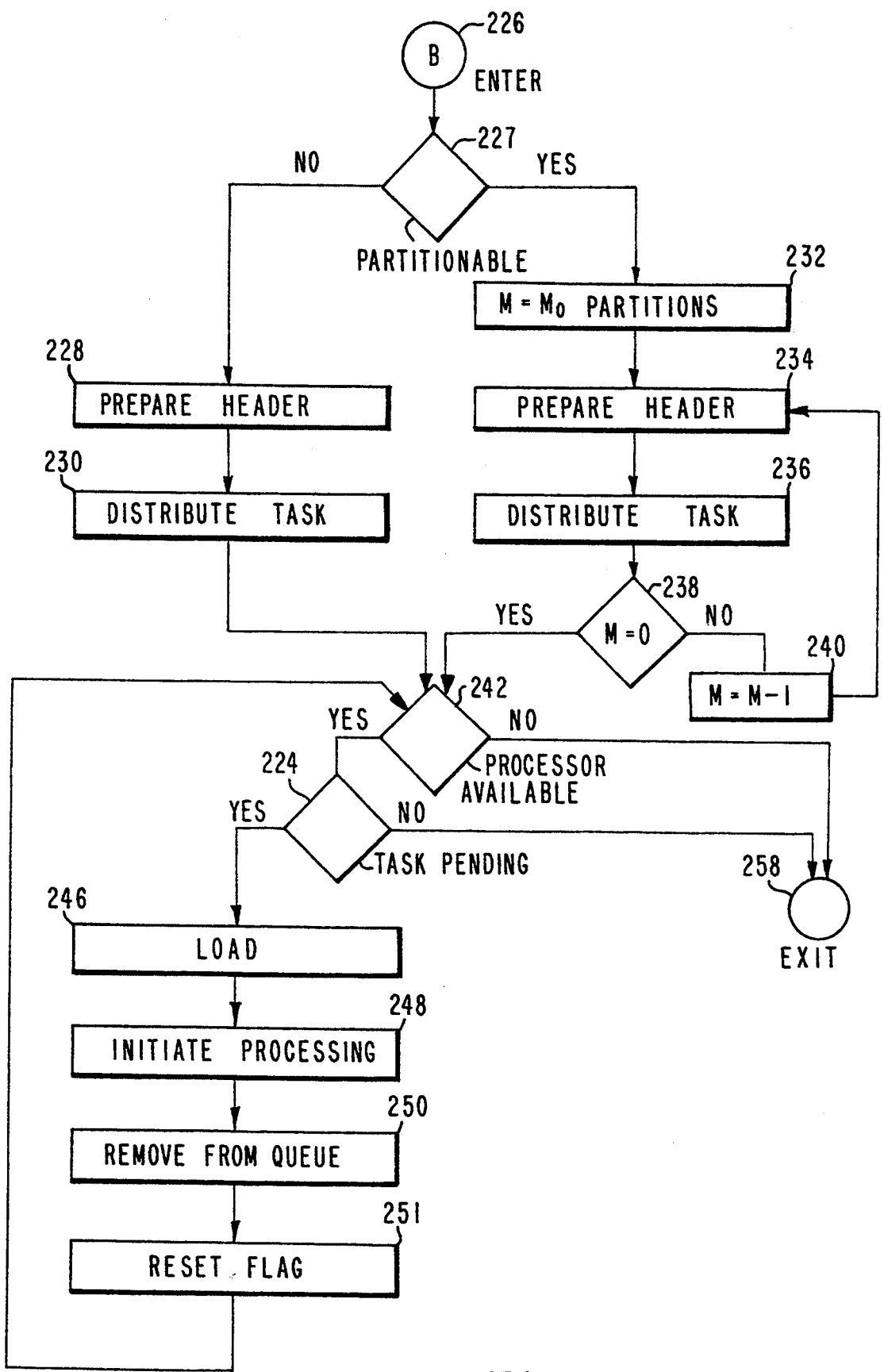

The control program in the instant control processor 112 is entered through the ENTER operation 211 and is initialized in the INITIALIZE operation 212. The program then proceeds to the PROCESSING COMPLETE test operation 214 to check whether a processing complete message has been received through signal lines 116 to determine if the related arithmetic processor 114 has completed its task. If the related arithmetic processor 114 has not completed its task, the program proceeds along the NO path from the PROCESSING COMPLETE operation 214 to exit through the EXIT operation 225 (FIG. 2a) and to enter through the ENTER operation 226 (FIG. 2b).

If the related arithmetic processor has completed its task, it buffers the processed data. The program then proceeds to the TASK PENDING test operation 216 to check the task queue to determine if a task is pending for the related arithmetic processor. For example, a check of queue pointers may be used to indicate if a task is pending in the task queue. If the input address pointer and the output address pointer are pointing at the same address, the task queue is empty and a task is not pending, and if the input address and output address pointers are pointing at addresses that are one or more blocks of data apart, the task queue is not empty and at least one task is pending.

If a pending task is detected in the TASK PENDING operation 216, the program proceeds along the YES path to the LOAD operation 218 to load data to be processed from the instant (source) arithmetic processor 112 (the arithmetic processor that is buffering the processed data) into the related (destination) arithmetic processor 114 (the related arithmetic processor that is assigned to process the buffered data) which is now available through the data bus 120. The program then proceeds to the INITIATE PROCESSING operation 220 to initiate the processing of the new task with the related arithmetic processor 114 by generating a processing initiation message through the interprocessor communication lines 116. The program then proceeds to the REMOVE FROM QUEUE operation 222 to remove the data and header associated with the task that was just assigned from the task queue of the instant control processor 112. The program then exits the FIG. 2a operations through the EXIT operation 225 and enters the FIG. 2b operations through the ENTER operation 226.

If there are no tasks pending, the program proceeds along the NO path from the TASK PENDING test operation 216 to the SEND PROCESSOR AVAILABLE MESSAGE operation 224. In the SEND PROCESSOR AVAILABLE MESSAGE operation 224, a processor available flag is set in the instant control processor 112 and a message is sent to the other control processors 114 through the communication lines 118 to alert them to the availability of the related arithmetic processor for other processing. The program then exits the FIG. 2a operations through the EXIT operation 225 and enters the FIG. 2b operations through the ENTER operation 226.

In FIG. 2b, the program proceeds from the ENTER operation 226 to the PARTITIONABLE test operation 227 to determine if the data buffered in the BUFFER DATA operation 215 is partitionable into a plurality of tasks. If the data buffered by the related arithmetic processor is not partitionable into a plurality of tasks, the program proceeds along the NO path to the PREPARE HEADER operation 228 to prepare a header for the data buffered by the related arithmetic processor 114 and then to the DISTRIBUTE TASK operation 230 where the data buffered by the related arithmetic processor 114 and the header generated in the PREPARE HEADER operation 228 are distributed, as discussed for the DISTRIBUTE TASK operation 236 below. The program then proceeds to the PROCESSOR AVAILABLE test operation 242.

If the data buffered in operation 215 is partitionable into a plurality of tasks, the program proceeds along the YES path from the PARTITIONABLE test operation 227 to the $M=M_0$ PARTITIONS operation 232 to set the m-parameter to $m_0$ as being indicative of $m_0$ partitions. The program then proceeds to the PREPARE HEADER operation 234 to prepare a header for a partitioned portion of the data buffered by the related arithmetic processor 114. This header is communicated from the instant control processor to the related arithmetic processor 114 through the communication lines 116 for combining with the partitioned data block related thereto. This header may include a time tag, a task identifier to identify the type of rusk and the nature of the processing to be performed, a source tag identifying the related arithmetic processor as the source, a block size parameter to identify the number of bytes utilized in the task queue, linking information to link each partitioned block of data to the other related partitioned blocks of data, and other information. The program then proceeds to the DISTRIBUTE TASK operation 236 where the ruth partition (from $m=0$ to $m=m_0$) of the data that was buffered by the related arithmetic processor and the partition header generated and communicated to the related arithmetic processor in the PREPARE HEADER operation 234 are distributed to the assigned processors, as discussed below.

In the DISTRIBUTE TASK operations 230 and 236, the task information (the data and related header) is distributed to the appropriate arithmetic processor 114 to be stored in the task queue therein for subsequent processing. If the task is to be processed by the related arithmetic processor 114, then the task information can be stored in the task queue of the related arithmetic processor 114 without communication through the data bus 120. If the task is to be processed by another one of the arithmetic processors 114, then the task information can be communicated through the data bus 120 to that other arithmetic processor 114 for storage in the task queue of that other arithmetic processor 114. Further, the instant control processor 112 transmits a message relative to the task to the control processor 112 that is related to the arithmetic processor 114 receiving the task information for the purpose of scheduling execution of the task. Alternatively, each arithmetic processor 114 may communicate processed data to the related control processor 112 through the communication lines 116, where the related control processor 112 buffers the dam for partitioning and distributes the partitioned data to the various arithmetic processors 114 for processing.

The program then loops through the iterative operations 238 and 240 to partition all of the data and to distribute the partitioned data as tasks. The program proceeds to the $M=0$ operation 238 to determine if the last partition has been processed. If the last partition has not been processed, the program proceeds along the NO path to the $M=M-1$ operation 240 to decrement the m-counter and then to loop back to the PREPARE HEADER operation 234 and the DISTRIBUTE TASK operation 236 for another partitioning and distributing iteration. When the last partition has been processed, the program proceeds along the YES path from the $M=0$ test operation to the PROCESSOR AVAILABLE operation 242. The program proceeds from the DISTRIBUTE TASK operation 230 or the $M=0$ test operation 238 to the PROCESSOR AVAILABLE test operation 242 to test to see if an arithmetic processor 114 is available.

If the related arithmetic processor 114 is available, the program proceeds along the YES path to the TASK PENDING test operation 244 to determine if a task is pending for assignment to the related arithmetic processor. The task pending operation can be implemented by checking the task queue to see if a task is pending. If a task is pending, the program proceeds along the YES path to the LOAD operation 246 to load data to be processed from the task queue into the current arithmetic processor 112, to the INITIATE PROCESSING operation 248 to initiate the processing of the new task with the current arithmetic processor 114, and to the REMOVE FROM QUEUE operation 250 to remove the header and data associated with the task that was assigned to the current arithmetic processor 114 from the task queue. The program then proceeds to the RESET FLAG operation 251 to reset the processor available flag associated with the current arithmetic processor 114 that is no longer available for task assignments.

If the PROCESSOR AVAILABLE test operation indicates that an arithmetic processor 114 is not available causing the program to proceed along the NO path therefrom or if the TASK PENDING test operation indicates that a task is not pending causing the program to proceed along the NO path therefrom, the program proceeds to the EXIT operation 258 to loop back to check for the processing complete signal in the PROCESSING COMPLETE test operation 214 through the EXIT operation 258 (FIG. 2b) and through the ENTER operation 260 (FIG. 2a).

Figure 3:
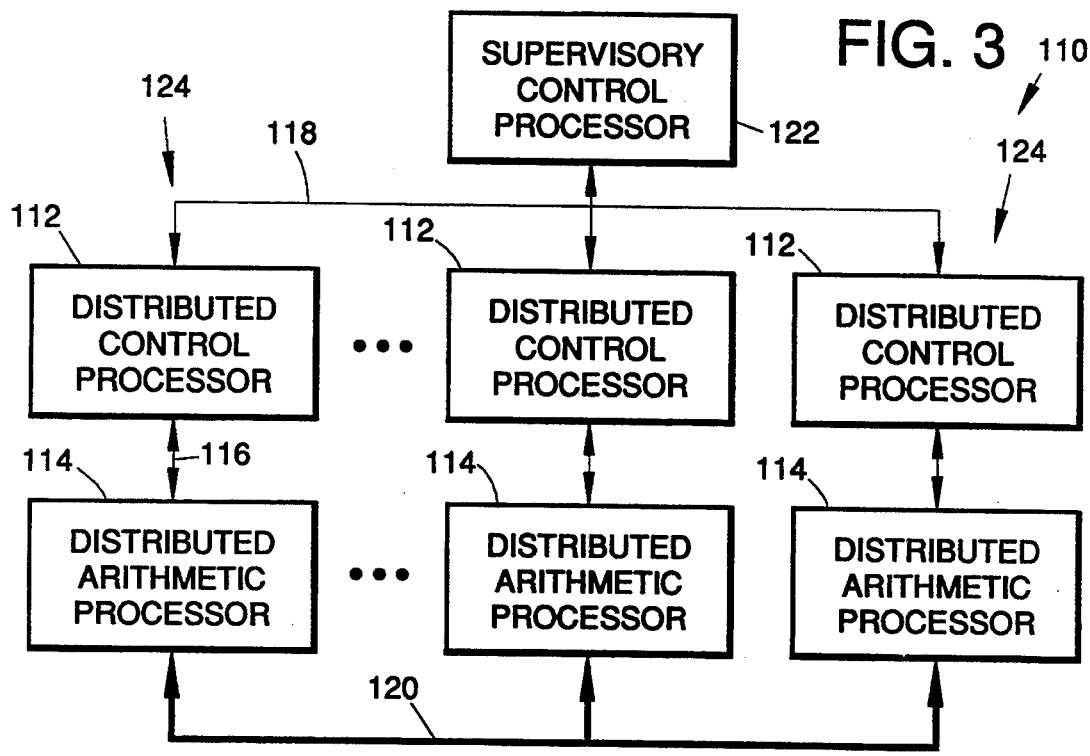
FIG. 3 shows a more detailed illustration of a distributed data flow signal processing network in accordance with the principles of the present invention.
Figure 4A:
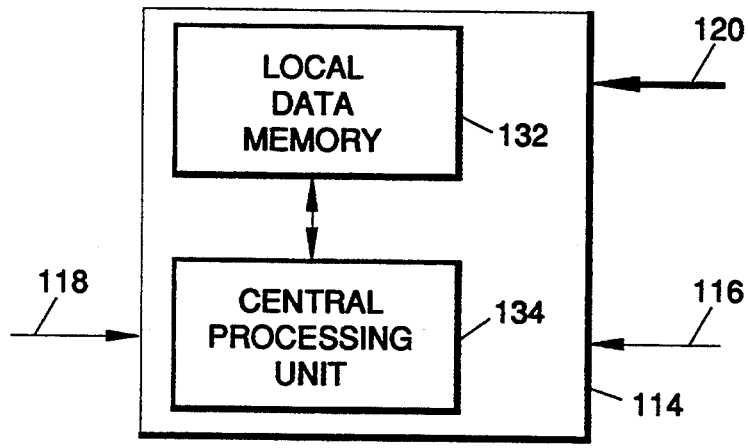
FIG. 4a shows a distributed control processor for use in the distributed data flow signal processing network of FIG. 3.

A more detailed explanation of the present invention is presented below. With reference to FIG. 3, the multiprocessor system 110 comprises a distributed data flow signal processing network 110a. The distributed data flow signal processing network 110a is comprised of a supervisory control processor 122 and a number of modularly configured processor nodes 124 comprising a distributed control processor 112 and a distributed arithmetic processor 114. A particular distributed arithmetic processor 114 is the associated arithmetic processor of the distributed control processor 112 to which it connects. With reference to FIG. 4a, the distributed arithmetic processor 114 is a high speed pipelined microprogrammable arithmetic processor with a large local data memory 132 and a central processing unit 134. The local data memory not only stores input and output data for current executing task, it also stores a reasonable amount of previously generated data for future usage.

Figure 4B:
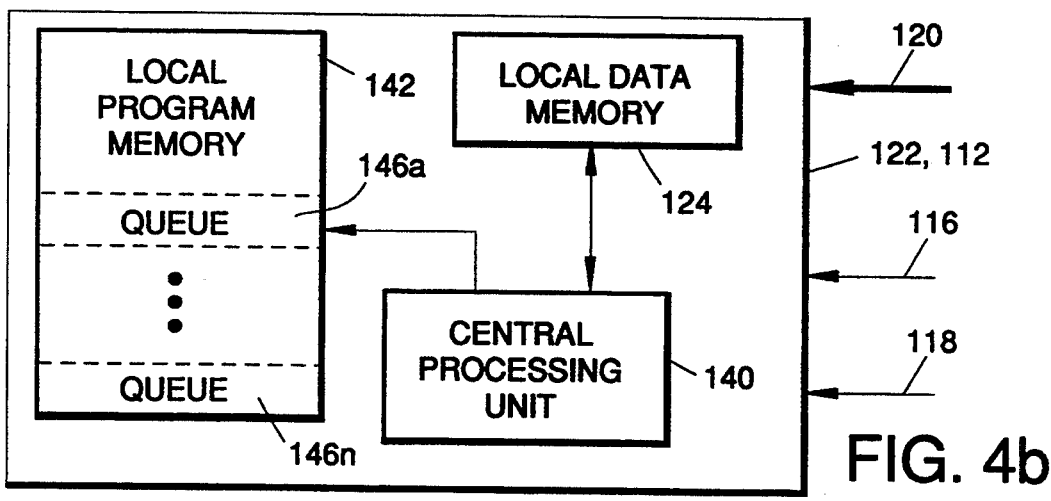
FIG. 4b shows a distributed arithmetic processor for use in the distributed data flow signal processing network of FIG. 3.

The distributed control processor 112 and the supervisory control processor 122 are shown in FIG. 4b, The distributed control processor 112 is comprised of a central processing unit 140, a local program memory 142 having a queue 146a, and local data memory 144. The supervisory control processor 122 comprises the central processing unit 140, the local data memory 144, and a plurality of queues 146a–146n equivalent to the total number of distributed control processors 112 plus one in the network 110a. The network control program executes on the distributed control processor 112 and the data used by the network control program are stored in its local program memory 142. The local data memory 144 is used to hold data overflow from the data memory 132 of the associated arithmetic processor 114. The distributed control processor 112 controls the loading and unloading between the data memory 213 of its associated arithmetic processor 114 and its local data memory 144. The supervisory control processor 122 may be physically part of one of the distributed control processors. That is, the network shown in FIG. 3 can be configured without a physical supervisory control processor 122 and the function of the supervisory control processor 122 is performed by one of the distributed control processors 112.

A signal processing application is executed as a group of signal processing primitive tasks in a data flow manner on the signal processing network 110a. A signal processing primitive task is a basic signal processing function, such as a fast Fourier transform (FFT), or a finite impulse response filter (FIR filter), for example. Therefore, a typical signal processing primitive task is computationally extensive and works on large blocks of input and output data. The signal processing primitive tasks are executed on the distributed arithmetic processors 114 on the network 110a. The execution of the signal processing primitive tasks are asynchronous among the distributed arithmetic processors 114 and a distributed control processor 112 dynamically dispatches tasks to its associated arithmetic processor 114 in a data flow manner. That is, a task is dispatched once there is enough data on all its inputs. A task may be dispatched multiple times, each executing on different segments of its inputs, for multiple asynchronous execution on multiple arithmetic processors 114.

The functions of control and scheduling of the signal processing primitive tasks are distributed among the distributed control processors 112. Each of the distributed control processors 112 is assigned to "own" a group of the signal processing primitive tasks in the application. The owner of a task is responsible for the control and scheduling aspects of the task but is not solely responsible for the dispatch aspect of the task. In this manner a signal processing primitive task is given preference for execution by the associated arithmetic processor 114 of the owner of the task, but it can be executed by any of the distributed arithmetic processors 114 in the network 110a. The coordination of the dispatching of a task to a specific distributed arithmetic processor 114 other than the one associated with the owner of the task is performed by the supervisory control processor 122. Since this coordination function is simple and does not require extensive processing, the control function of the network 110a is distributed and the control bottleneck is removed.

When tasks are assigned owners, they are assigned in such a manner that a cluster of tasks connected by input and output is assigned to a owner. That is, disconnected tasks that might be assigned to the same owner are avoided. Since the associated arithmetic processor 114 is given the preference to execute tasks by the task owner, the data transfer activity among the processor nodes 124 is minimized if connected tasks are assigned to a given distributed control processor 112.

Three communication links are provided for message transfers and data transfers. The first communication link is provided by communication lines 118 and is used for connection among the supervisory control processor 122 and all distributed control processors 112. This communication link is used for passing short message tokens among these processors. The second communication link is provided by communication lines 116 and is used to make private connection between a distributed control processor 112 and its associated distributed arithmetic processor 114. This communication link is used to pass short message tokens as well as large blocks of data between these processors. The third communication link is provided by the data bus 120 and is used to connect among all the distributed arithmetic processors 114. This communication link is used for passing blocks of data among these processors at high speed.

Figure 5:
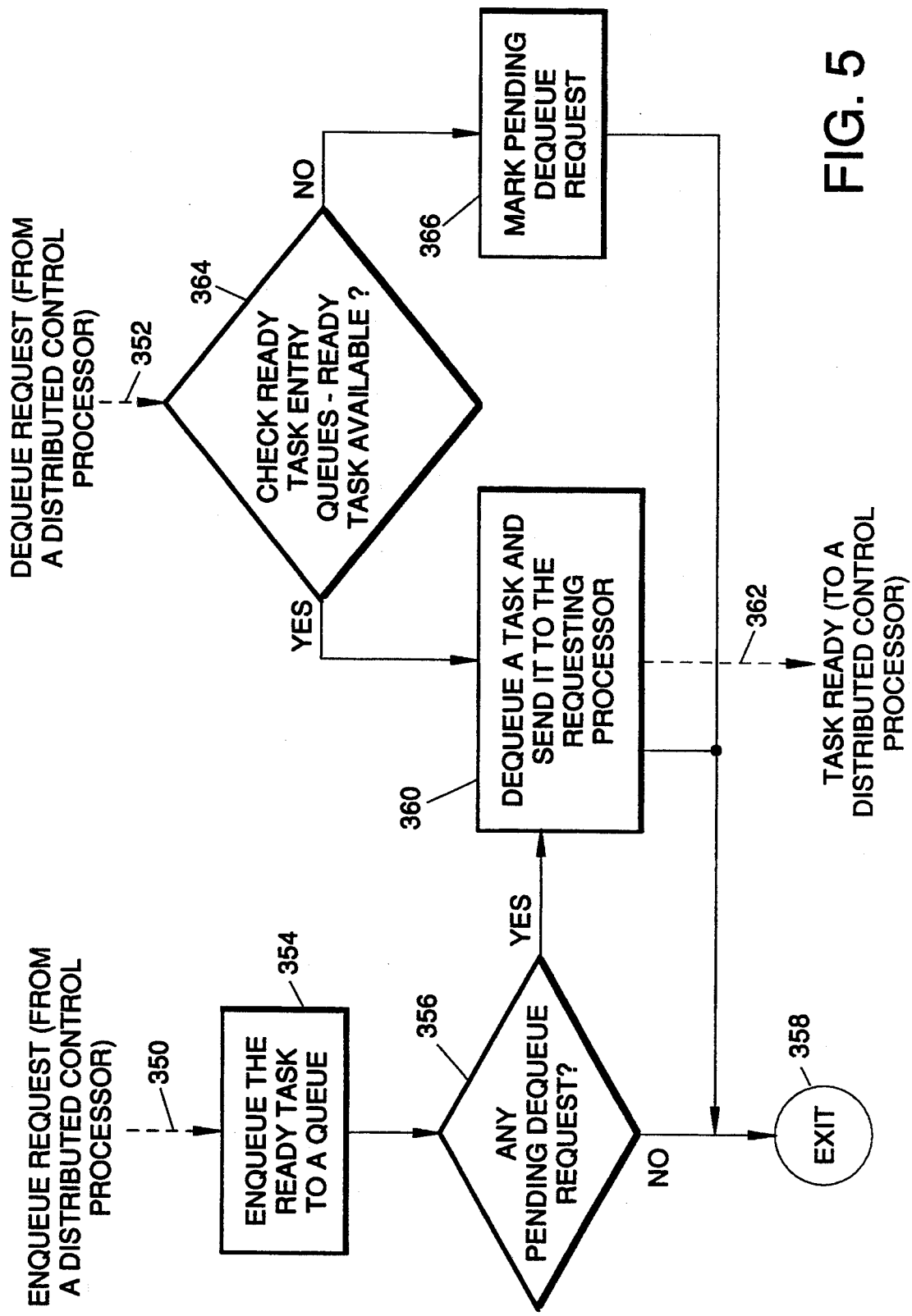
FIG. 5 shows the process flow performed by the supervisory control processor of the distributed data flow signal processing network of FIG. 3.

The processing performed the supervisory control processor 122 (or an appropriately configured distributed control processor 112) is shown in FIG. 5. The process flow has two entry points triggered by the arrivals of input messages and one output message generation point. One entry point is entered upon the receiving of a ENQUEUE REQUEST message 350 from a distributed control processor 112. Another entry point is entered upon the receiving of a DEQUEUE REQUEST message 352 from a distributed control processor 112.

A particular distributed control processor 112 performs control and scheduling functions for the tasks it owns. If a task has enough input data generated by the distributed arithmetic processors 114 for the task execution, the distributed control processor 112 schedules the task to be executed one or more times, with one or more ready task entries. Multiple ready task entries may be generated from the same signal processing primitive task but must have separate input data blocks. A ready task entry contains information relating to the identification of the signal processing primitive function and the input data blocks associated therewith. The input data blocks of a ready task entry may be scattered among the data memories 132, 144 of multiple processor nodes 124. Ready task entries are queued in the distributed control processor 112 which owns the task waiting to be dispatched to the associated arithmetic processor 114. To avoid lead imbalance among the distributed arithmetic processors 114, an upper limit is placed on the local ready task entry queue 146. When a distributed control processor schedules more ready task entries than the size of its local ready task entry queue 146, the additional ready task entries are sent to the supervisory control processor 122 by way of ENQUEUE REQUEST messages 350. The supervisory control processor 122 has one ready task entry queue 146 for each of the distributed control processors 112. When the supervisory control processor 122 receives an ENQUEUE REQUEST message 350, it enqueues 354 the information regarding the ready task in the ready task entry queue 146 belonging to the distributed control processor 112 that sent the ENQUEUE REQUEST message 350. Pending de, queue requests are then checked 356 and the program exits 358. If there are no pending dequeue requests, the ENQUEUE REQUEST message 350 handling function is completed. If there is a pending dequeue request, the ready task entry is immediately dequeued 360 and sent to the distributed control processor 112 that made the pending dequeue request and the program exits 358.

When a distributed control processor 112 tries to dispatch a task to its associated arithmetic processor 114 but its local ready task entry queue 146 is empty, the distributed control processor 112 generates and sends a DEQUEUE REQUEST message 352 to the supervisory control processor 122. When the supervisory control processor 122 receives a DEQUEUE REQUEST message 352 from a distributed control processor 112, it dequeues an entry from the ready task entry queue 146 belonging to the requesting distributed control processor 112. If this queue 146 is empty, then the ready task entry queues 146 belonging to other distributed control processors 112 are checked. If a ready task entry is dequeued, it is sent to the requesting distributed control processor 112 via a TASK READY message 362. If all the ready task entry queues 146 of the supervisory control processor 122 are empty, then a pending dequeue request is marked 366 for the requesting distributed control processor 112. In this manner, the preference of dispatching a task to the owner's associated arithmetic processor 114 is kept if possible.

Ready task entries can overflow to the supervisory control processor 122 for two reasons. Overflow can happen at the system peak loading time when each processor node 124 has more ready task entries than it can hold locally. In this case, the ready task entries held by the supervisory control processor 122 are likely go back to the control processor 112 and associated arithmetic processor 114 that originally transferred control of its task. Overflow can also happen to a number of distributed control processors 112 in the network 110a while the other processor nodes 124 are idle. In this case, a ready task will be executed by a distributed arithmetic processor 114 other than the preferred one. When this happens, the data transfer activities among the processor nodes 124 may increase but dynamic processor load balancing is achieved.

Figure 6A:
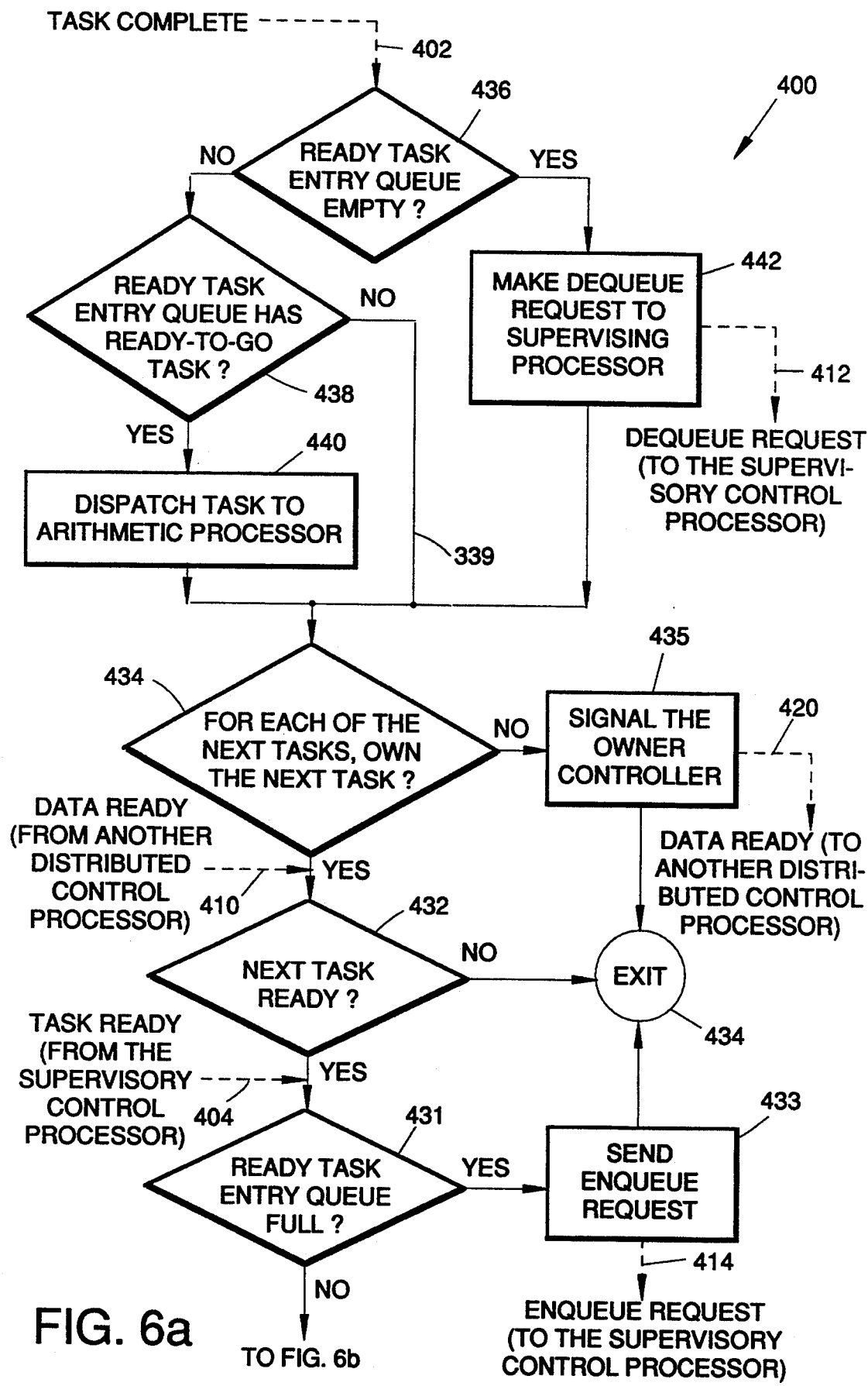
FIGS. 6a and 6b show the process flow performed by the distributed control processor of the distributed data flow signal processing network of FIG. 3.
Figure 6B:
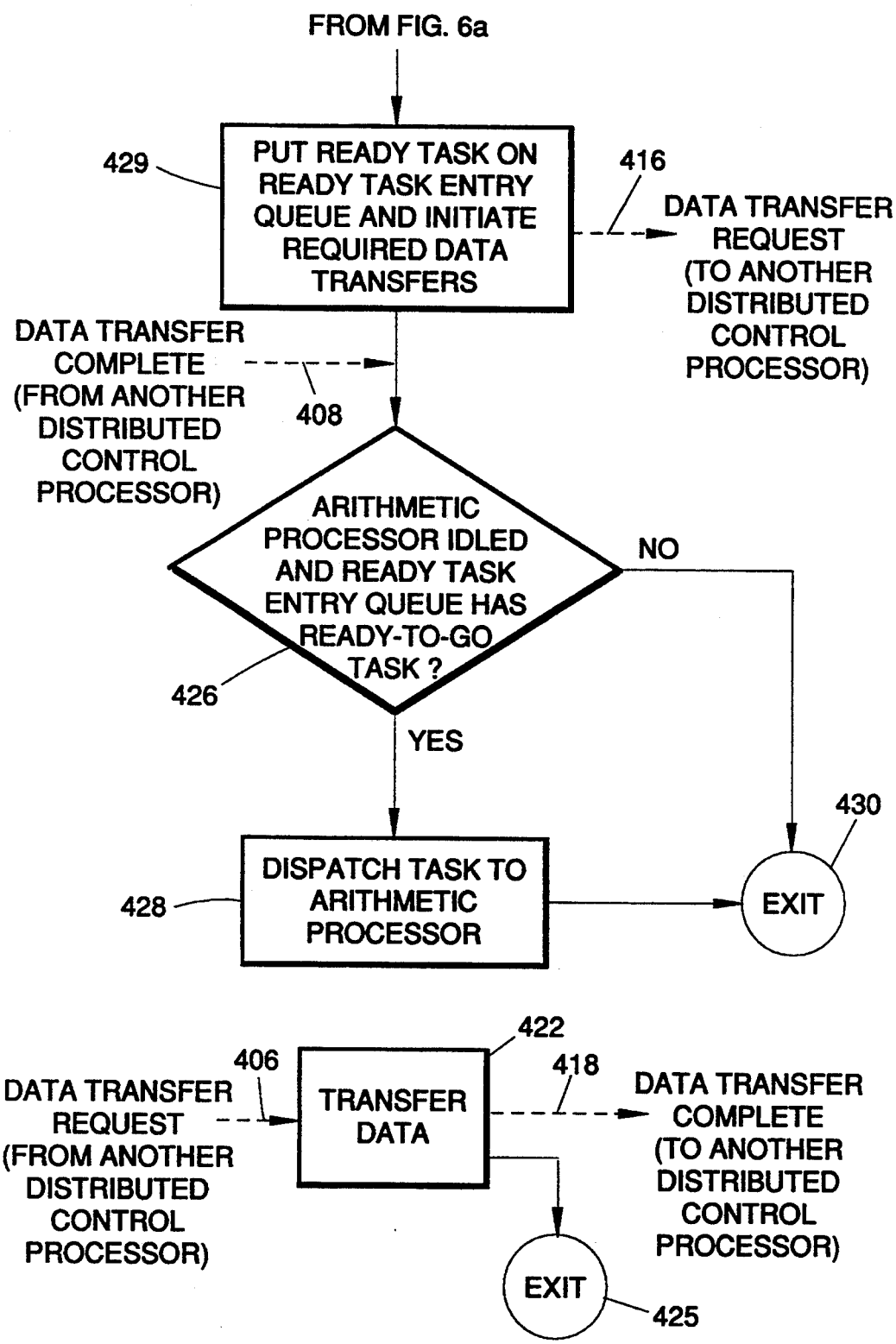

The process flow 400 performed by each distributed control processor 112 is shown in FIGS. 6a and 6b. This process flow 400 has five entry points triggered by the arrivals of input messages and five output message generation points. The entry points are entered upon the arrival of a TASK COMPLETE message 402 from the associated arithmetic processor 114, the arrival of a TASK READY message 404 from the supervisory control processor 122, the arrival of a DATA TRANSFER REQUEST message 406, a DATA TRANSFER COMPLETE message 408, or a DATA READY message 410 from another distributed control processor 112. The distributed control processor 112 generates and sends DEQUEUE REQUEST and ENQUEUE REQUEST messages 412, 414 to the supervisory control processor 122. It also generates and sends DATA TRANSFER REQUEST, DATA TRANSFER COMPLETE, and DATA READY messages 416, 418, 420 to the other distributed control processors 112.

As shown in FIG. 6b, the processing triggered by the arrival of a DATA TRANSFER REQUEST message 406 is disjointed from the processing triggered by the arrival of other messages 402, 404, 408, 410. With reference to FIG. 6a, the processing triggered by the arrival of a TASK COMPLETE message 402 joins the processing triggered by the arrival of a DATA READY message 410 after some preprocessing. The processing triggered by the arrival of a DATA READY message 410 joins the processing triggered by the arrival of a TASK READY message 404 after some preprocessing. And the processing triggered by the arrival of a TASK READY message 404 joins the processing triggered by the arrival of a DATA TRANSFER COMPLETE message 408 after some preprocessing. To avoid repetitive discussion of the processing, we shall discuss FIGS. 6a and 6b from the bottom of the drawing figures.

As discussed above, a ready task entry contains information to identify the signal processing primitive function and all its input data blocks of the ready task. An input data block of the ready task may reside in the memory 132, 144 of another processor node 124. When a ready task entry is put onto the ready task entry queue 146 in a distributed control processor 112, all data blocks which reside in other processor nodes 124 must be transferred to the data memory 132 of the distributed arithmetic processor 114. To obtain a data block from another processor node 124, a distributed control processor 112 generates and sends a DATA TRANSFER REQUEST message 406 to the distributed control processor 112 where the data block resides. When the distributed control processor 112 receives the DATA TRANSFER REQUEST message 406, it initiates the data transfer 422 to its destination via the data bus 120 that interconnects the distributed arithmetic processors 114. If the requested data block was unloaded from the data memory 132 of the distributed arithmetic processor 114 to the local data memory 144 of the distributed control processor 112 to make room in the arithmetic processor data, the data block must be loaded back into the data memory 132 of the arithmetic processor 114 before initiating the data transfer 422. When the data transfer 422 is completed, the distributed control processor 112 generates and sends a DATA TRANSFER COMPLETE message 418 to the distributed control processor 112 that requested the data transfer, and this portion of the process exits 424.

When a distributed control processor 112 receives a DATA TRANSFER COMPLETE message 408, it relates the message 408 to an entry in its ready task entry queue 146. If the data transfer causes all of the input data blocks of the ready task entry to reside in the data memory 132 of the associated arithmetic processor 114, the ready task entry is marked as READY-TO-GO 426. That is, a READY-TO-GO ready task entry is ready to be dispatched 428 to the associated arithmetic processor 114 for immediate task execution while a non-READY-TO-GO ready task entry is not yet ready to be dispatched for execution, and the process exits 430. If the ready task entry queue 146 contains a READY-TO-GO entry 426 and the associated arithmetic processor 114 is ready for new task dispatching, then that ready task entry is dequeued from the ready task entry queue 146 and is dispatched 428 to the associated arithmetic processor 114.

The distributed control process flow 400 is also entered upon receiving a TASK READY message 404 from the supervisory control processor 122. At this point, the distributed control processor 112 has a ready task entry to be enqueued to the ready task entry queue 146. If the ready task entry is generated by the distributed control processor 112, it is possible the ready task entry queue 146 is full at this time. If the ready task entry is received with the TASK READY message (the distributed control processor 112 made a request to the supervisory control processor 122 due to lack of ready task), its is unlikely but still possible, that the ready task entry queue 146 is full at this time. That is, after a DEQUEUE REQUEST is made to the supervisory control processor 122 and before a TASK READY reply is received from the supervisory control processor 122, it is possible a TASK COMPLETE message 402 from the associated arithmetic processor 114 made many new ready task entries to fill up the ready task entry queue 146. When the distributed control processor 112 has a ready task entry to be enqueued to the ready task entry queue 146 but the ready task entry queue 146 is full 431, an ENQUEUE REQUEST message 414 is generated and sent 433 to the supervisory control processor 122 and the processing is completed. If the ready task entry queue 146 is not full 431, the ready task entry is enqueued 429 to the ready task entry queue 146 and for each data block of the ready task entry residing in another processing node 124, a DATA TRANSFER REQUEST message 416 is generated and sent to the processor node 124 that holds the data block. If the ready task entry queue 146 contains a READY-TO-GO entry 426 (e.g., all the input data blocks of the new ready task entry reside locally), and the associated arithmetic processor 114 is ready for new task dispatching, then that ready task entry is dequeued from the ready task entry queue 146 and is dispatched 428 to the associated arithmetic processor 114.

When a signal processing primitive task finishes execution (entry to step 434), new data blocks are generated. The next task that takes the output generated by the just completed task as its input may be ready for execution. If the next task is owned 434 by a distributed control processor 112 other than the one which is processing the task completion, a DATA READY message 420 is generated and sent 435 to the owner distributed control processor 112. When a distributed control processor 112 receives a DATA READY message 420 from another distributed control processor 112, it checks the status change to the next task which takes the data block of the DATA READY message 420 as its input. If the next task is not yet ready 432, the process is completed and an exit 434 is made. If the next task is ready 432, a new ready task entry (or entries) is generated and the new ready task entry is processed (via steps 431, 433) in the same way as the ones received via TASK READY messages 404 as discussed above.

When an arithmetic processor 114 completed the execution of a signal processing primitive task, it sends a TASK COMPLETION message 402 to the associated distributed control processor 112. When the distributed control processor 112 receives such a message 402, it first takes care of dispatching 440 a task entry to the arithmetic processor 114 (as described below) before it starts processing the task completion's impact on the other tasks. If the ready task entry queue 146 is empty 436, then the distributed control processor 112 does not have a task entry for immediate dispatching 440. In this case, the distributed control processor 112 generates and sends 442 a DEQUEUE REQUEST message 412 to the supervisory control processor 122 asking for a ready task and then it proceeds to handle the task completion's impact on the other tasks. If the ready task entry queue 146 is not empty 436 but none of the entries are READY-TO-GO 438, then no immediate dispatching can be made, as is indicated by path 439. Since the ready task entry queue 146 is not empty, DATA TRANSFER REQUEST messages 416 had been sent and some responses to these requests (DATA TRANSFER COMPLETE messages 408) that will be respired later will make a task dispatching 428 possible. At this time, the distributed control processor 112 proceeds to handle the task completion's impact on the other tasks. If the ready task entry queue 146 is not empty 436 and some of the entries are READY-TO-GO 438, then a READY-TO-GO entry is immediately dispatched 440 and then proceeds to handle the task completion's impact on the other tasks.

A task (Task B) is said to be the next task relative to another task (Task A) if at least one of the Task B's input is from Task A's output. A task may have many next tasks. A task may be the next task of many other tasks. A task may also be one of its own next tasks. In a data flow system, task scheduling is based on the availability of its input data. Therefore, the completion of a task impacts the task schedule of all its next tasks and has task schedule impacts only to its next tasks. When a task is completed and new output data blocks are made available, each of its next tasks must be examined because new ready task entries may be generated with the new data blocks. For each of the next tasks of a completed task, the following process is performed. If the distributed control processor 112 that is processing the TASK COMPLETE message 402 is the owner of the next task 434, it proceeds to the same processing as if a DATA READY message 410 is received. If it does not own the next task 434, it generates and sends 435 a DATA READY message 420 to the distributed control processor 112 that owns the next task, and the processing of this next task is completed.

Thus them has been described a new distributed data flow signal processing network that processes primitive signal processing tasks in a manner that balances the processing load among nodes of the network. It is to be understood that the above-described embodiment is merely illustrative of some of the many specific embodiments that represent applications of the principles of the present invention. Clearly, numerous and varied other arrangements may be designed by those skilled in the art without departing from the scope of the invention.

What is claimed is:

1. A distributed data flow signal processing network for processing data flow signal processing primitive tasks in a manner that balances the processing load among nodes of the network, said network comprising:

a plurality of distributed control processors, each comprising a central processing unit coupled to a data memory, and to a program memory having a queue, and wherein one of the distributed control processors comprises a supervisory control processor having additional queues equal in number to the number of distributed control processors in the network, and wherein each of the additional queues are associated with a respective one of the distributed control processors;

a first communication link coupled between each of the distributed control processors for transferring control messages therebetween;

a plurality of distributed arithmetic processors, each comprising a central processing unit and a data memory, and wherein individual ones of the plurality of distributed arithmetic processors are respectively associated with a selected one of the plurality of distributed control processors to form a plurality of processing nodes;

a second communication link coupled between each respective processor of the plurality of distributed control processors and its associated distributed arithmetic processor that forms a respective processing node, for transferring control messages and data blocks therebetween; and a third communication link comprising a data bus coupled between each of the distributed arithmetic processors for transferring data blocks therebetween;

each of the distributed control processors assigned one or more types of the signal processing primitive tasks in the application to have processing control over said primitive tasks so that the distributed arithmetic processor associated with the distributed control processor assigned a given type of primitive task is given preference for execution of the given task, each of the distributed control processors comprising means for monitoring the number of signal processing primitive tasks in its program memory queue that are to be processed by its associated arithmetic processor and for transferring processing control over selected tasks to the supervisory control processor if the number of processing tasks are above a predetermined limit;

the supervisory control processor comprising means for monitoring the number of processing tasks to be performed by each of the processing nodes, and for causing the execution by selected ones of the processing nodes of said processing tasks for which processing control has been transferred by said distributed control processor, to allocate the processing load among all the nodes to redistribute the processing load among the distributed arithmetic processors.

2. The network of claim 1 wherein the supervisory control processor further comprises means for controlling the coupling of input data blocks required for processing of the selected primitive processing tasks to the arithmetic processor of the selected one of the processing nodes from selected locations in the plurality of processing nodes that hold the required data blocks.

3. The network of claim 1 wherein the respective queues of the supervisory control processor are adapted to store information regarding the processing of primitive processing tasks sent by respective ones of the plurality of distributed control processors.

4. The network of claim 1 wherein the respective queues store information relating to the identification of the signal processing primitive tasks and the input data blocks associated therewith.

5. The network of claim 2 wherein the respective queues of the supervisory control processor are adapted to store information regarding the processing of primitive processing tasks sent by respective ones of the plurality of distributed control processors.

6. The network of claim 5 wherein the respective queues store information relating to the identification of the signal processing primitive tasks and the input data blocks associated therewith.

* * * * *